(12) United States Patent
Muthukrishnan

(10) Patent No.: US 12,273,450 B2
(45) Date of Patent: *Apr. 8, 2025

(54) SYSTEM, METHOD, AND COMPUTER PROGRAM PRODUCT FOR VALIDATING SOFTWARE AGENTS IN ROBOTIC PROCESS AUTOMATION SYSTEMS

(71) Applicant: Visa International Service Association, San Francisco, CA (US)

(72) Inventor: Ravi Krishnan Muthukrishnan, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,474

(22) Filed: Aug. 16, 2023

(65) Prior Publication Data

US 2023/0396429 A1    Dec. 7, 2023

Related U.S. Application Data

(63) Continuation of application No. 17/022,267, filed on Sep. 16, 2020, now Pat. No. 11,764,956.

(51) Int. Cl.
*H04L 9/08* (2006.01)
*H04L 9/30* (2006.01)
*H04L 9/32* (2006.01)

(52) U.S. Cl.
CPC ............... *H04L 9/088* (2013.01); *H04L 9/30* (2013.01); *H04L 9/3236* (2013.01)

(58) Field of Classification Search
None
See application file for complete search history.

(56) References Cited

U.S. PATENT DOCUMENTS

| | | |
|---|---|---|
| 9,491,164 B1 | 11/2016 | Fay et al. |
| 9,676,097 B1 | 6/2017 | Gallagher |
| 10,157,275 B1 | 12/2018 | Venkatasamy et al. |
| 10,158,480 B1 | 12/2018 | Winklevoss et al. |
| 10,382,965 B2 | 8/2019 | Spangemacher et al. |
| 10,579,974 B1 | 3/2020 | Reed |

(Continued)

FOREIGN PATENT DOCUMENTS

KR    1020080019826 A    3/2008

*Primary Examiner* — Saleh Najjar
*Assistant Examiner* — Shadi H Kobrosli
(74) *Attorney, Agent, or Firm* — The Webb Law Firm

(57) ABSTRACT

Provided is a system that includes at least one processor programmed or configured to provision a client device for access to an online source of information, transmit a private encryption key of a public/private encryption key pair to a software agent of the client device, receive a first hash value from the software agent, wherein the first hash value is generated using the private encryption key, receive a second hash value from the software agent, determine whether to allow access to the online source of information by the software agent based on the first hash value and the second hash value received from the software agent, process a request to access the online source of information involving the software agent, and store a data record associated with a data transaction involving the online source of information in a data structure. Methods and computer program products are also provided.

20 Claims, 12 Drawing Sheets

(56) References Cited

U.S. PATENT DOCUMENTS

| | | | |
|---|---|---|---|
| 10,747,875 B1* | 8/2020 | Stoler | H04L 9/3247 |
| 11,405,196 B2* | 8/2022 | Keskar | G06Q 20/40 |
| 11,436,127 B1 | 9/2022 | Raghavendran et al. | |
| 11,816,236 B1* | 11/2023 | Gupta | G06F 21/6218 |
| 2008/0214300 A1 | 9/2008 | Williams et al. | |
| 2014/0019764 A1 | 1/2014 | Gopal et al. | |
| 2015/0172292 A1 | 6/2015 | Kuang et al. | |
| 2015/0254451 A1* | 9/2015 | Doane | G06F 21/44 |
| | | | 726/1 |
| 2016/0294562 A1 | 10/2016 | Oberheide et al. | |
| 2017/0063838 A1 | 3/2017 | Yin et al. | |
| 2017/0230184 A1 | 8/2017 | Alwarappan et al. | |
| 2017/0286651 A1 | 10/2017 | Erhart et al. | |
| 2017/0346640 A1 | 11/2017 | Smith et al. | |
| 2018/0114000 A1 | 4/2018 | Taylor | |
| 2018/0373863 A1* | 12/2018 | Domke | H04L 9/3236 |
| 2019/0333054 A1 | 10/2019 | Cona et al. | |
| 2020/0042958 A1 | 2/2020 | Soundararajan et al. | |
| 2020/0344186 A1 | 10/2020 | Parekh et al. | |
| 2021/0036854 A1 | 2/2021 | Dunjic et al. | |
| 2021/0297423 A1 | 9/2021 | Gagnon | |
| 2022/0028010 A1 | 1/2022 | Jeske et al. | |

* cited by examiner

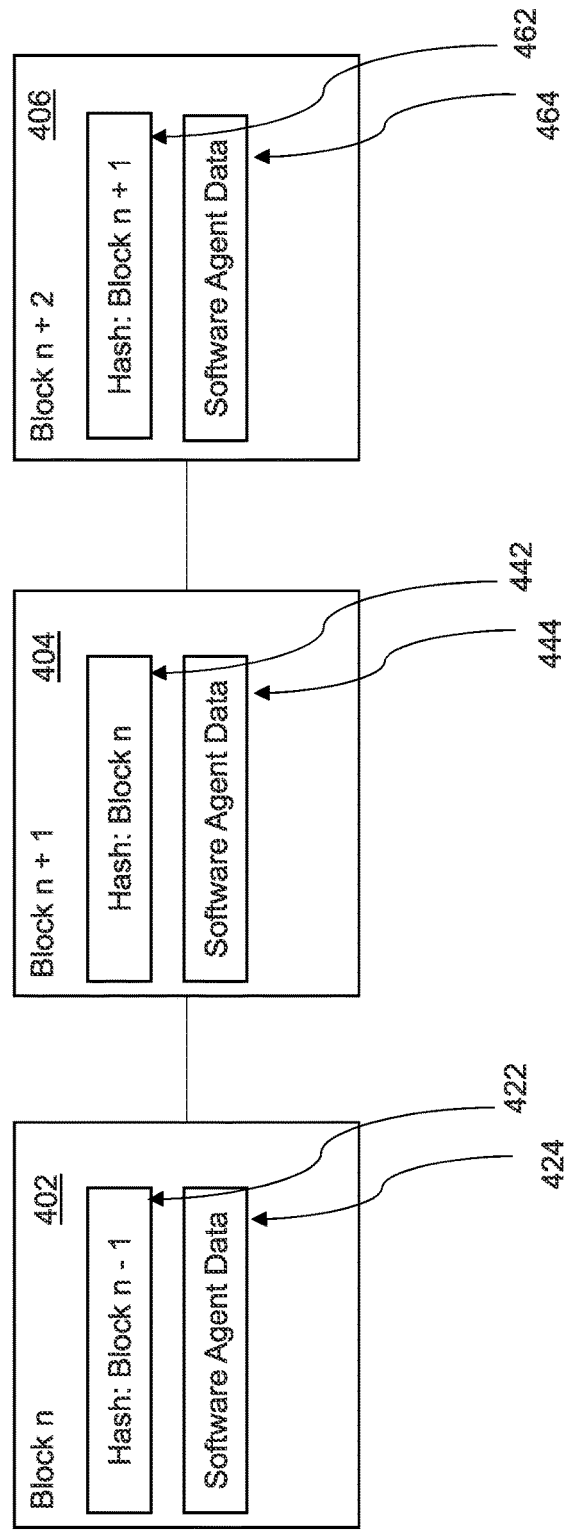

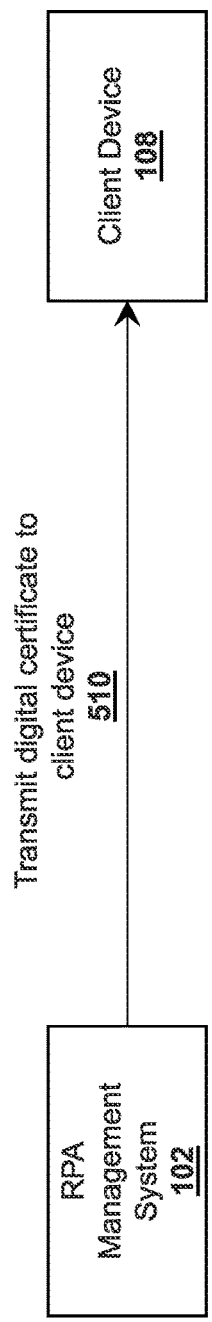

FIG. 5D

| Encryption Key: | Software Agent 110-1 | Software Agent 110-2 | Software Agent 110-3 |
|---|---|---|---|
| | Private Encryption Key1 | Private Encryption Key2 | Private Encryption Key3 |
| Software Agent Identifier: | USBSoftwareAgent1 | USBSoftwareAgent2 | USBSoftwareAgent3 |
| Software Agent Role Identifier: | Account_balances | Transaction_histories | Account_holder_names |

500

Generate and store software agent credential data
520

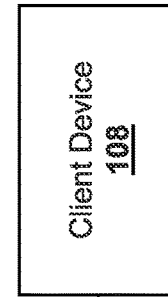

RPA Management System 102

Transmit plurality of private encryption keys to client device
525

Client Device 108

SYSTEM, METHOD, AND COMPUTER PROGRAM PRODUCT FOR VALIDATING SOFTWARE AGENTS IN ROBOTIC PROCESS AUTOMATION SYSTEMS

CROSS REFERENCE TO RELATED APPLICATION

This application is a continuation application of U.S. patent application Ser. No. 17/022,267, filed Sep. 16, 2020, the disclosure of which is incorporated herein by reference in its entirety.

BACKGROUND

1. Field

This disclosure relates generally to detecting software agents and, in some non-limiting embodiments or aspects, to systems, methods, and computer program products for validate software agents in robotic process automation systems to allow access to information.

2. Technical Considerations

A software agent may be a computer program that acts for an entity (e.g., a user or another computer program) in a relationship of agency. In some instances, a software agent may have the authority to decide (e.g., on behalf on the entity with which the software agent has an agency relationship) which, if any, action is appropriate. A software agent may be colloquially referred to as a bot, which comes from the word robot. The software agent may include a physical manifestation, as when execution of an action of the software agent is paired with an action of a device, such as a robot body. In some instances, the software agent may include a service without a physical manifestation, such as a virtual assistant executing on a mobile device (e.g. a chatbot executing on a smartphone), or other computing device. Software agents may be autonomous or work together with other software agents or other users (e.g., human beings, people, individuals, and/or the like). In some instances, a software agent may interact with users, for example, in human-robot interaction environments, and the software agent may possess human-like qualities, such as natural language understanding, speech, personality, and/or a humanoid form.

Robotic process automation (RPA) may be a form of process automation technology based on the use of software agents to perform a task that would otherwise be performed by a user (e.g., a human being as a user). In some instances, an RPA system may develop a task by watching a user perform the task in a graphical user interface (GUI) of a software application. The RPA system may then employ one or more software agents to perform the task via automation by repeating the task directly in the GUI. In some instances, the RPA system may use one or more software agents to access information from an online source.

In some instances, when an RPA system attempts to use a software agent to access secure information from an online source, such as a financial institution, the online source may require the software agent to be authenticated and authorized before the online source allows the software agent to access the secure information. In such an example, the online source may require the software agent to provide credentials for access, such as a username and a password, to be authenticated and authorized.

However, providing the username and the password for the software agent may allow the software agent to access too much information. Additionally, the software agent may not be able to use credentials for access, since the software agent may be required to store the credentials for access in a location that is not secure. Storing the credentials for access may defeat the purpose and advantage of using the credentials for access as the credentials may be stolen. Furthermore, the software agent may not be able to access the secure information from the online source if the online source uses knowledge-based authentication and/or a step-up authentication method, such as multi-factor authentication. For example, the software agent may not be able to properly respond to a knowledge-based challenge or a multi-factor authentication challenge, if the challenge requires a response that changes over time or requires human intuition to provide a response.

SUMMARY

Accordingly, disclosed are systems, methods, and computer program products for validating software agents in robotic process automation (RPA) systems.

According to some non-limiting embodiments or aspects, provided is a system comprising: at least one processor programmed or configured to: provision a client device for access to an online source of information; transmit a private encryption key of a public/private encryption key pair to a software agent of the client device; receive a first hash value from the software agent of the client device, wherein the first hash value is generated using the private encryption key; receive a second hash value from the software agent of the client device; determine whether to allow access to the online source of information by the software agent based on the first hash value and the second hash value received from the software agent of the client device; process a request to access the online source of information involving the software agent of the client device, wherein, when processing the request to access the online source of information, the at least one processor is programmed or configured to: allow the software agent to conduct a data transaction involving the online source of information based on determining to allow access to the online source of information by the software agent of the client device; and store a data record associated with the data transaction involving the online source of information in a data structure.

According to some non-limiting embodiments or aspects, provided is a computer-implemented method comprising: provisioning, with at least one processor, a client device for access to an online source of information; transmitting, with at least one processor, a private encryption key of a public/private encryption key pair to a software agent of the client device; receiving, with at least one processor, a first hash value from the software agent of the client device, wherein the first hash value is generated using the private encryption key; receiving, with at least one processor, a second hash value from the software agent of the client device; determining, with at least one processor, to allow access to the online source of information by the software agent based on the first hash value and the second hash value received from the software agent of the client device; processing, with at least one processor, a request to access the online source of information involving the software agent of the client device, wherein processing the request to access the online source of information comprises: allowing the software agent to conduct a data transaction involving the online source of information based on determining to allow access to the online source of information by the software agent of the client device; and storing, with at least one processor, a data record associated with the data transaction involving the online source of information in a data structure.

According to some non-limiting embodiments or aspects, provided is a computer program product, the computer program product comprising at least one non-transitory computer-readable medium including one or more instructions that, when executed by at least one processor, cause the at least one processor to: provision a client device for access to an online source of information; transmit a private encryption key of a public/private encryption key pair to a software agent of the client device; receive a first hash value from the software agent of the client device, wherein the first hash value is generated using the private encryption key; receive a second hash value from the software agent of the client device; determine whether to allow access to the online source of information by the software agent based on the first hash value and the second hash value received from the software agent of the client device; process a request to access the online source of information involving the software agent of the client device, wherein, when processing the request to access the online source of information, the at least one processor is programmed or configured to: allow the software agent to conduct a data transaction involving the online source of information based on determining to allow access to the online source of information by the software agent of the client device; and store a data record associated with the data transaction involving the online source of information in a distributed ledger.

Further non-limiting embodiments or aspects are set forth in the following numbered clauses:

Clause 1: A system comprising: at least one processor programmed or configured to: provision a client device for access to an online source of information; transmit a private encryption key of a public/private encryption key pair to a software agent of the client device; receive a first hash value from the software agent of the client device, wherein the first hash value is generated using the private encryption key; receive a second hash value from the software agent of the client device; determine whether to allow access to the online source of information by the software agent based on the first hash value and the second hash value received from the software agent of the client device; process a request to access the online source of information involving the software agent of the client device, wherein, when processing the request to access the online source of information, the at least one processor is programmed or configured to: allow the software agent to conduct a data transaction involving the online source of information based on determining to allow access to the online source of information by the software agent of the client device; and store a data record associated with the data transaction involving the online source of information in a data structure.

Clause 2: The system of clause 1, wherein, when storing the data record associated with the data transaction involving the online source of information in the data structure, the at least one processor is programmed or configured to: store the data record associated with the data transaction involving the online source of information in a distributed ledger.

Clause 3: The system of clauses 1 or 2, wherein the at least one processor is further programmed or configured to: store the first hash value with an identifier of the software agent of the client device in the data structure; and wherein, when determining whether to allow access to the online source of information by the software agent of the client device, the at least one processor is programmed or configured to: retrieve the first hash value from the data structure based on the identifier of the software agent of the client device; compare the second hash value received from the software agent to the first hash value retrieved from the data structure; and determine to allow access to the online source of information by the software agent of the client device based on determining that the second hash value received from the software agent corresponds to the first hash value retrieved from the data structure.

Clause 4: The system of any of clauses 1-3, wherein, when receiving the second hash value from the software agent of the client device, the at least one processor is programmed or configured to: receive the request to access the online source of information from the software agent, wherein the request to access the online source of information includes the second hash value and data associated with the software agent of the client device.

Clause 5: The system of any of clauses 1-4, wherein, when determining whether to allow access to the online source of information by the software agent of the client device, the at least one processor is programmed or configured to: determine whether to allow access to the online source of information by the software agent of the client device based on the first hash value, the second hash value and data associated with the software agent of the client device included in the request to access the online source of information; and wherein, when processing the request to access the online source of information involving the software agent of the client device, the at least one processor is programmed or configured to: allow the software agent to conduct the data transaction involving a specific type of data included in the online source of information based on the data associated with the software agent of the client device.

Clause 6: The system of any of clauses 1-5, wherein, when receiving the second hash value from the software agent of the client device, the at least one processor is programmed or configured to: receive the request to access sensitive data included in the online source of information from the software agent, wherein the request to access sensitive data included in the online source of information includes the second hash value.

Clause 7: The system of any of clauses 1-6, wherein the at least one processor is further programmed or configured to: transmit a challenge question to the software agent of the client device; and receive a response to the challenge question from the software agent of the client device; wherein, when determining whether to allow access to the online source of information by the software agent of the client device, the at least one processor is programmed or configured to: determine whether to allow access to the sensitive data included in the online source of information by the software agent of the client device based on the first hash value, the second hash value, and the response to the challenge question from the software agent of the client device.

Clause 8: The system of any of clauses 1-7, wherein the at least one processor is further programmed or configured to: receive an initialization access request from the client device, wherein the initialization access request is a request for authorization to access the online source of information by the software agent of the client device; and wherein, when transmitting the private encryption key of the public/private encryption key pair to the software agent of the client device, the at least one processor is programmed or configured to: transmit the private encryption key of the public/ private encryption key pair to the software agent of the client device based on receiving the initialization access request from the client device.

Clause 9: A computer implemented method, comprising: provisioning, with at least one processor, a client device for access to an online source of information; transmitting, with at least one processor, a private encryption key of a public/private encryption key pair to a software agent of the client device; receiving, with at least one processor, a first hash value from the software agent of the client device, wherein the first hash value is generated using the private encryption key; receiving, with at least one processor, a second hash value from the software agent of the client device; determining, with at least one processor, to allow access to the online source of information by the software agent based on the first hash value and the second hash value received from the software agent of the client device; processing, with at least one processor, a request to access the online source of information involving the software agent of the client device, wherein processing the request to access the online source of information comprises: allowing the software agent to conduct a data transaction involving the online source of information based on determining to allow access to the online source of information by the software agent of the client device; and storing, with at least one processor, a data record associated with the data transaction involving the online source of information in a data structure.

Clause 10: The method of clause 9, wherein storing the data record associated with the data transaction involving the online source of information in the data structure comprises: storing the data record associated with the data transaction involving the online source of information in a distributed ledger.

Clause 11: The method of clauses 9 or 10, further comprising: storing the first hash value with an identifier of the software agent of the client device in a data structure, wherein determining to allow access to the online source of information by the software agent of the client device comprises: retrieving the first hash value from the data structure based on the identifier of the software agent of the client device; comparing the second hash value received from the software agent to the first hash value retrieved from the data structure; and determining to allow access to the online source of information by the software agent of the client device based on determining that the second hash value received from the software agent corresponds to the first hash value retrieved from the data structure.

Clause 12: The method of any of clauses 9-11, wherein receiving the second hash value from the software agent comprises: receiving a request to access the online source of information from the software agent, wherein the request to access the online source of information includes the second hash value and data associated with the software agent of the client device.

Clause 13: The method of any of clauses 9-12, further comprising: wherein determining to allow access to the online source of information by the software agent of the client device comprises: determine to allow access to the online source of information by the software agent of the client device based on the first hash value, the second hash value, and data associated with the software agent of the client device included in the request to access the online source of information; and wherein processing the request to access the online source of information involving the software agent of the client device comprises: allowing the software agent to conduct the data transaction involving a specific type of data included in the online source of information based on the data associated with the software agent of the client device.

Clause 14: The method of any of clauses 9-13, further comprising: transmitting a challenge question to the software agent of the client device; and receiving a response to the challenge question from the software agent of the client device; wherein determining to allow access to the online source of information by the software agent of the client device comprises: determining to allow access to sensitive data included in the online source of information by the software agent of the client device based on the first hash value, the second hash value, and the response to the challenge question from the software agent of the client device.

Clause 15: The method of any of clauses 9-14, further comprising: receiving an initialization access request from the client device, wherein the initialization access request is a request for authorization to access the online source of information by the software agent of the client device; and wherein transmitting the private encryption key of the public/private encryption key pair to the software agent of the client device comprises: transmitting the private encryption key of the public/private encryption key pair to the software agent of the client device based on receiving the initialization access request from the client device.

Clause 16: A computer program product, the computer program product comprising at least one non-transitory computer-readable medium including one or more instructions that, when executed by at least one processor, cause the at least one processor to: provision a client device for access to an online source of information; transmit a private encryption key of a public/private encryption key pair to a software agent of the client device; receive a first hash value from the software agent of the client device, wherein the first hash value is generated using the private encryption key; receive a second hash value from the software agent of the client device; determine whether to allow access to the online source of information by the software agent based on the first hash value and the second hash value received from the software agent of the client device; process a request to access the online source of information involving the software agent of the client device, wherein, when processing the request to access the online source of information, the at least one processor is programmed or configured to: allow the software agent to conduct a data transaction involving the online source of information based on determining to allow access to the online source of information by the software agent of the client device; and store a data record associated with the data transaction involving the online source of information in a distributed ledger.

Clause 17: The computer program product of clause 16, wherein the one or more instructions that cause the at least one processor to receive the second hash value from the software agent of the client device, cause the at least one processor to: receive a request to access the online source of information from the software agent, wherein the request to access the online source of information includes the second hash value and data associated with the software agent of the client device.

Clause 18: The computer program product of clauses 16 or 17, wherein, the one or more instructions that cause the at least one processor to determine whether to allow access to the online source of information by the software agent of the client device, cause the at least one processor to: determine whether to allow access to the online source of information by the software agent of the client device based on the first hash value, the second hash value, and data associated with the software agent of the client device included in the request to access the online source of information; and wherein, the one or more instructions that cause the at least one processor to process the request to access the online source of information involving the software agent of the client device, cause the at least one processor to: allow the software agent to conduct the data transaction involving a specific type of data included in the online source of information based on the data associated with the software agent of the client device.

Clause 19: The computer program product of any of clauses 16-18, wherein, the one or more instructions that cause the at least one processor to receive the second hash value from the software agent of the client device, cause the at least one processor to: receive a request to access sensitive data included in the online source of information from the software agent, wherein the request to access sensitive data included in the online source of information includes the second hash value.

Clause 20: The computer program product of any of clauses 16-19, wherein the at least one processor is further programmed or configured to: transmit a challenge question to the software agent of the client device; and receive a response to the challenge question from the software agent of the client device; wherein, the one or more instructions that cause the at least one processor to determine whether to allow access to the online source of information by the software agent of the client device, cause the at least one processor to: determine whether to allow access to the sensitive data included in the online source of information by the software agent of the client device based on the first hash value, the second hash value, and the response to the challenge question from the software agent of the client device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A and 4B are diagrams of a non-limiting embodiment or aspect of a distributed ledger; and FIGS. 5A-5G are diagrams of an implementation of a non-limiting embodiment or aspect of a process for validating a software agent of an RPA system.

DESCRIPTION

Figure 1:
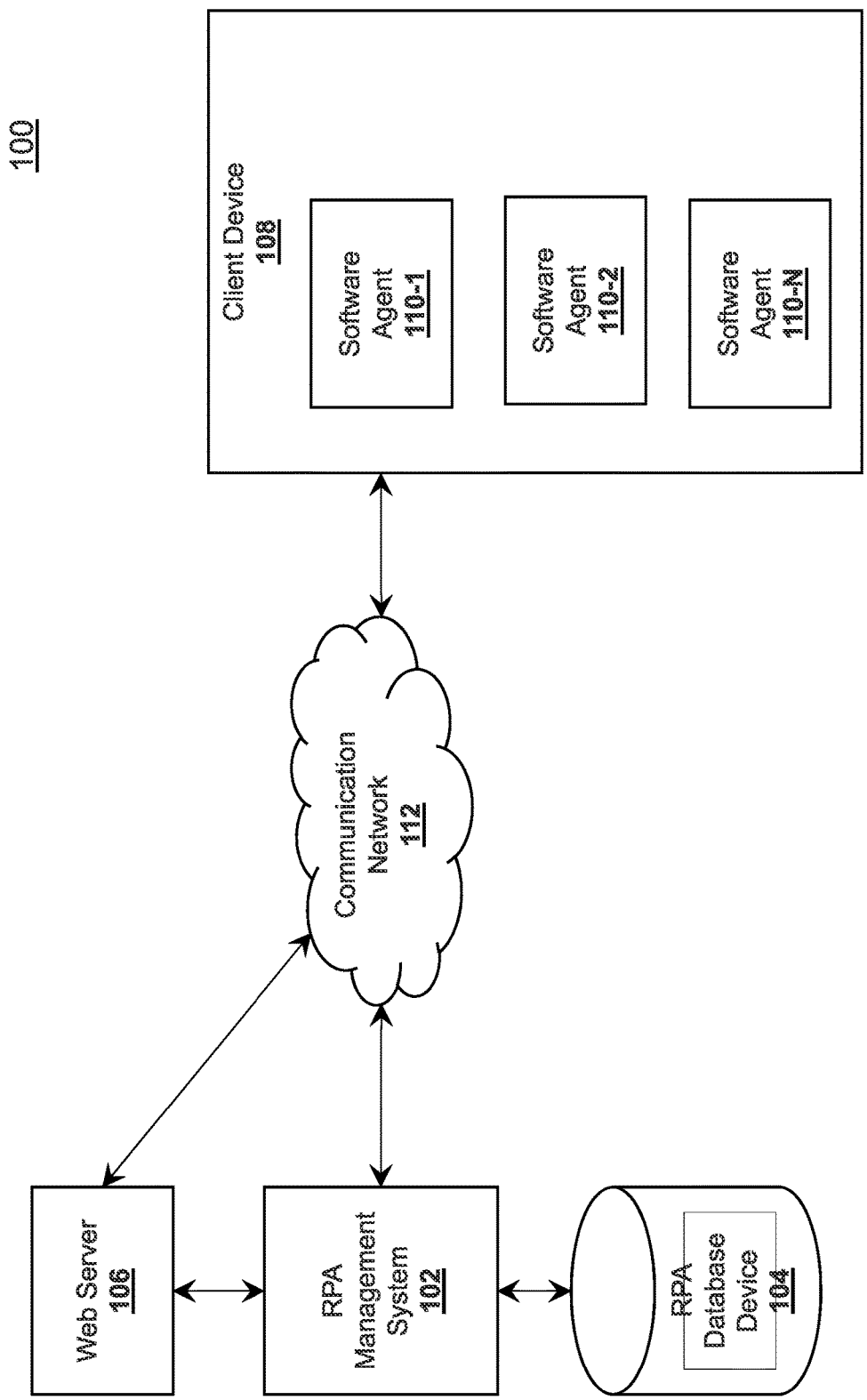
FIG. 1 is a diagram of a non-limiting embodiment or aspect of a system for validating a software agent of a robotic process automation (RPA) system.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, personal digital assistants (PDAs), wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for validating a software agent of an RPA system. In some non-limiting embodiments or aspects, a system, such as an RPA management system, may include at least one processor programmed or configured to provision a client device for access to an online source of information, transmit a private encryption key of a public/private encryption key pair to the software agent of the client device, receive a hash value from the software agent of the client device, wherein the hash value is generated using the private encryption key, determine whether to allow access to an online source of information by the software agent based on the hash value received from the software agent of the client device, process a request to access the online source of information involving the software agent of the client device, and store a data record associated with a data transaction conducted by the software agent of the client device in a data structure.

In this way, non-limiting embodiments or aspects of the system the software agent may prevent the software agent from access too much information of the online source of information. Additionally, the system may allow the software agent access the online source of information without the use of credentials for access and, accordingly, may eliminate a need for the software agent to store the credentials for access in a location that is not secure. In addition, non-limiting embodiments or aspects of the system may also allow the software agent to access the secure information (e.g., sensitive data) from the online source. In this way, the system may allow for software agents to access an online source of information that is part of a legacy system without reconfiguring and/or moving the online source of information to an updated system.

Referring now to FIG. 1, FIG. 1 is a diagram of an example environment 100 in which devices, systems, methods, and/or products described herein may be implemented. As shown in FIG. 1, environment 100 includes robotic process automation (RPA) management system 102, RPA database device 104, web server 106, one or more software agents 110-1 through 110-N (N≥1) (hereinafter referred to collectively as "software agents 110" and individually as "software agent 110"), and communication network 112. RPA management system 102, RPA database device 104, web server 106, and software agents 110 may interconnect (e.g., establish a connection to communicate, and/or the like) via wired connections, wireless connections, or a combination of wired and wireless connections.

RPA management system 102 may include one or more devices configured to be in communication with web server 106, client device 108, and/or software agents 110 via communication network 112. For example, RPA management system 102 may include one or more computing devices, such as one or more servers, one or more groups of servers, and/or the like. In some non-limiting embodiments or aspects, RPA management system 102 may be associated with a transaction service provider.

RPA database device 104 may include one or more devices configured to be in communication with RPA management system 102. For example, RPA database device 104 may include one or more computing devices, such as one or more servers, and/or the like. In some non-limiting embodiments or aspects, RPA management system 102 may store data (e.g., data records) in RPA database device 104 and/or retrieve data from RPA database device 104. In some non-limiting embodiments or aspects, RPA database device 104 may be associated with a transaction service provider.

Web server 106 may include one or more devices configured to be in communication with RPA management system 102, client device 108, and/or software agents 110 via communication network 112. For example, web server 106 may include one or more servers, one or more groups of servers, and/or the like. In some non-limiting embodiments or aspects, web server 106 may be associated with a transaction service provider (e.g., a transaction service provider also associated with RPA management system 102). In some non-limiting embodiments or aspects, web server 106 may be a component of RPA management system 102. In some non-limiting embodiments or aspects, web server 106 may include a device that is separate from RPA management system 102.

Client device 108 may include one or more devices configured to be in communication with RPA management system 102 and/or web server 106 via communication network 112. For example, client device 108 may include a smartphone, a tablet, a laptop computer, a desktop computer, and/or the like. In some non-limiting embodiments or aspects, client device 108 may be associated with a user (e.g., an individual operating client device 108). For example, client device 108 may be associated with a user that uses client device 108 to carry out an operation (e.g., an operation associated with accessing an online resource or an online service). In some non-limiting embodiments or aspects, client device 108 may subscribe to a service associated with accessing an online source of information provided by a transaction service provider (e.g., a transaction service provider associated with RPA management system 102).

Software agent 110 (e.g., each software agent of software agents 110) may include one or more devices configured to be in communication with RPA management system 102 and/or web server 106 via communication network 112. For example, software agent 110 may include a smartphone, a tablet, a laptop computer, a desktop computer, and/or the like. In some non-limiting embodiments or aspects, software agent 110 may include one or more devices that are configured to carry out operations associated with a software agent (e.g., a bot) in an RPA system. In some non-limiting embodiments or aspects, software agent 110 may be a component of client device 108. In some non-limiting embodiments or aspects, software agent 110 may include a device that is separate from client device 108.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
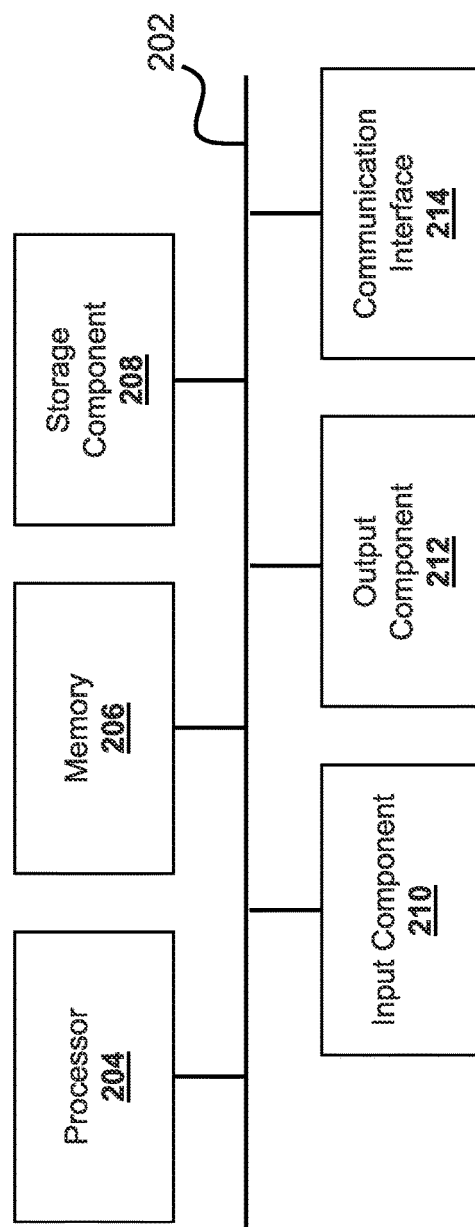
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to one or more devices of RPA management system 102, web server 106, client device 108, and/or software agents 110. In some non-limiting embodiments or aspects, RPA management system 102, web server 106, client device 108, and/or software agents 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
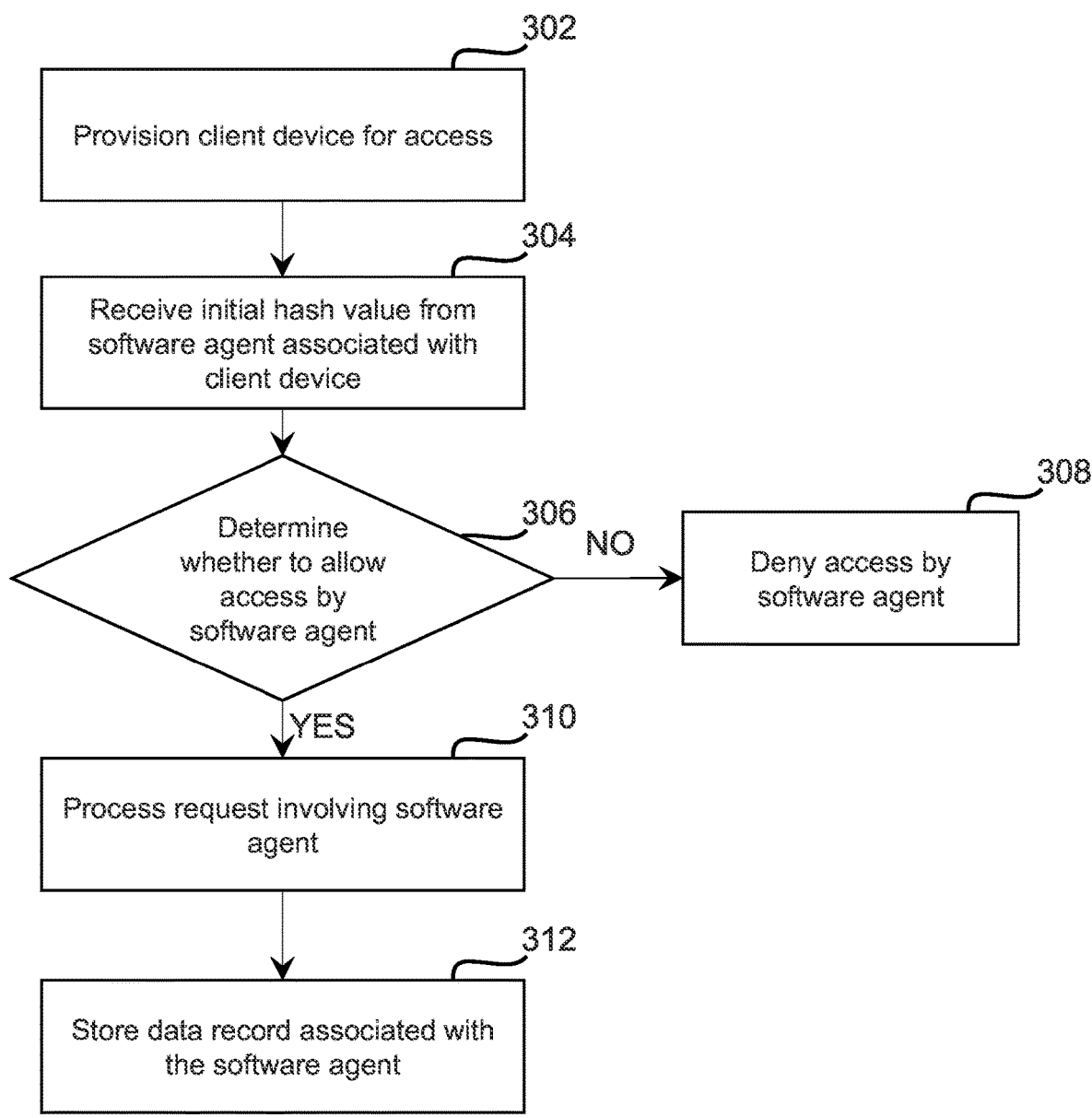
FIG. 3 is a flowchart of a non-limiting embodiment or aspect of a process for validating a software agent of an RPA system.

Referring now to FIG. 3, FIG. 3 is a flowchart of a non-limiting embodiment or aspect of a process 300 for validating a software agent in an RPA system. In some non-limiting embodiments or aspects, one or more of the functions described with respect to process 300 may be performed (e.g., completely, partially, etc.) by RPA management system 102. In some non-limiting embodiments or aspects, one or more of the steps of process 300 may be performed (e.g., completely, partially, and/or the like) by another device or a group of devices separate from and/or including RPA management system 102, such as, for example, RPA database device 104, web server 106, client device 108, and/or software agent 110 (e.g., one or more software agents of software agents 110).

As shown in FIG. 3, at step 302, process 300 may include provisioning a client device for access. For example, RPA management system 102 may provision client device 108 for access to an online service (e.g. an online service associated with an online source of information) and/or an online resource (e.g., an online resource associated with an online source of information) provided by a transaction service provider (e.g., a transaction service provider that operates RPA management system 102 and/or web server 106). In some non-limiting embodiments or aspects, RPA management system 102 may provision the client for access to the online service and/or the online resource by issuing a digital certificate to client device 108 for authentication of client device 108. For example, RPA management system 102 may provision the client for access to the online service and/or the online resource by issuing a digital certificate for client device 108 for mutual authentication (e.g., mutual transport layer security (mTLS) authentication) of client device 108. In some non-limiting embodiments or aspects, RPA management system 102 may provision client device 108 for access to the online service and/or the online resource based on verifying client device 108. For example, RPA management system 102 may provision client device 108 for access to the online service and/or the online resource based on verifying an identity of a user associated with client device 108 (e.g., a financial institution that operates client device 108). In some non-limiting embodiments or aspects, RPA management system 102 may verify the identity of the user associated with client device 108 based on an identifier of the user, such as a financial institution identifier (e.g., a bank identification number (BIN), a bank identifier (BID), and/or the like).

In some non-limiting embodiments or aspects, RPA management system 102 may provision client device 108 for access to the online service and/or the online resource based on a verification request from client device 108. For example, RPA management system 102 may provision client device 108 for access to the online service and/or the online resource based on receiving the request from client device 108. In some non-limiting embodiments or aspects, the verification request from client device 108 may include data associated with a requested operation (e.g., allowing access to the online service) and/or an identifier of the user associated with client device 108. In some non-limiting embodiments or aspects, RPA management system 102 may transmit the digital certificate issued to client device 108 based on (e.g., in response to) the verification request from client device 108. In some non-limiting embodiments or aspects, RPA management system 102 may transmit a verification response based on (e.g., in response to) the verification request from client device 108, where the verification response may include the digital certificate issued to client device 108.

In some non-limiting embodiments or aspects, RPA management system 102 may provision client device 108 for access to an online source of information (e.g. an online service associated with an online source of information or an online resource associated with an online source of information). For example, RPA management system 102 may provision client device 108 for access to an online source of information associated with web server 106.

In some non-limiting embodiments or aspects, the online source of information may include a source of non-sensitive data and/or a source of sensitive data. In some non-limiting embodiments or aspects, the online source of information may include a source of transaction data associated with payment transactions processed by a transaction service provider (e.g., a transaction service provider that operates RPA management system 102 and/or web server 106). In some non-limiting embodiments or aspects, the transaction data associated with payment transactions (e.g., transactions involved in credit accounts), may include sensitive data associated with a party involved in the payment transactions. For example, the transaction data associated with payment transactions may include payment card industry (PCI) information, such as an account number of an account holder involved in a payment transaction, an expiration date of an account of an account holder involved in a payment transaction, a card verification value (CVV) of a payment device (e.g., a payment card) involved in a payment transaction, and/or the like, personally identifiable information (PII) of an account holder, such as a name, an address, an email address, a telephone number, a social security number, and/or the like, of an account holder, and/or other sensitive data associated with an account holder involved in a payment transaction.

In some non-limiting embodiments or aspects, RPA management system 102 may provision one or more client devices 108 (e.g., one or more client devices 108). For example, RPA management system 102 may provision the one or more clients for access to an online source of information (e.g., an online source of information associated with the transaction service provider) based on subscriptions of the one or more client devices that allow access to the online source of information.

In some non-limiting embodiments or aspects, RPA management system 102 may provision one or more software agents 110 (e.g., one or more software agents 110 associated with client device 108) for access to the online source of information. For example, RPA management system 102 may provision one or more software agents 110 for access to the online source of information by providing software agent credential data associated with access credentials to the online source of information. In some non-limiting embodiments or aspects, the software agent credential data associated with access credentials to the online source of information may include data associated with an identifier of a software agent, such as a software agent identifier (e.g., a unique identifier of a software agent), data associated with a role of a software agent, such as a software agent role identifier (e.g., a unique identifier of an operation to be carried out by a software agent and/or an indication of a specific type of data upon which the software agent is to carry out the operation), and/or a private encryption key of a public/private encryption key pair that is to be assigned to one or more software agents 110. In some non-limiting embodiments or aspects, RPA management system 102 may generate the public/private encryption key pair that is to be assigned to one or more software agents 110. In some non-limiting embodiments or aspects, the software agent credential data associated with access credentials to the online source of information may be used by RPA management system 102 to determine whether to allow access to the online source of information by one or more software agents 110.

In some non-limiting embodiments or aspects, RPA management system 102 may provision the one or more software agents 110 for access to the online source of information based on an initialization access request. For example, RPA management system 102 may provision the one or more software agents 110 for access to the online source of information based on an initialization access request received from client device 108. In some non-limiting embodiments or aspects, the initialization access request is a request for authorization to access the online source of information by the one or more software agents 110 of client device 108. In some non-limiting embodiments or aspects, the initialization access request may include data associated with the digital certificate issued to client device 108, data associated with an identifier of client device 108, data associated with one or more identifiers of one or more software agents 110, and/or data associated with one or more roles of (e.g., operations to be carried out by) one or more software agents 110.

In some non-limiting embodiments or aspects, RPA management system 102 may receive the initialization access request from client device 108 and RPA management system 102 may generate the software agent credential data associated with access credentials to the online source of information. RPA management system 102 may transmit the software agent credential data associated with access credentials to the online source of information to client device 108. In some non-limiting embodiments or aspects, RPA management system 102 may transmit an initialization access response to client device 108, where the initialization access response includes the software agent credential data associated with access credentials to the online source of information. In some non-limiting embodiments or aspects, RPA management system 102 may transmit the private encryption key of the public/private encryption key pair that is to be assigned to the one or more software agents 110 based on (e.g., in response to) the initialization access request from client device 108.

In some non-limiting embodiments or aspects, RPA management system 102 may store the software agent credential data associated with access credentials to the online source of information for one or more software agents 110. For example, RPA management system 102 may store the software agent credential data so that the software agent credential data (e.g., a software agent identifier, a software agent role identifier, and/or a private encryption key of a public/private encryption key pair) is assigned to one or more software agents 110. In some non-limiting embodiments or aspects, RPA management system 102 may store the software agent credential data in RPA database device 104.

As shown in FIG. 3, at step 304, process 300 may include receiving an initial hash value from a software agent associated with the client device. For example, RPA management system 102 may receive the initial hash value from software agent 110 associated with client device 108. In some non-limiting embodiments or aspects, RPA management system 102 may receive an initial (e.g., a first) hash value from software agent 110 associated with client device 108 as part of an initialization process for software agent 110. In such an example, RPA management system 102 may receive the initial hash value from software agent 110 before software agent 110 requests access to the online source of information (e.g., requests access to the online source of information for a data transaction to retrieve information from the online source of information). In some non-limiting embodiments or aspects, RPA management system 102 may receive one or more initial hash values from one or more software agents 110 associated with client device 108.

In some non-limiting embodiments or aspects, the initial hash value may be generated (e.g., generated by software agent 110) using a private encryption key associated with software agent 110. For example, the initial hash value may be generated using the private encryption key (e.g., the private encryption key of the software agent credential data associated with access credentials to the online source of information for software agent 110) generated by RPA management system 102 and assigned to software agent 110. In some non-limiting embodiments or aspects, the initial hash value may be generated, using the private encryption key, as a hash value based on (e.g., a hash value of) software agent credential data associated with access credentials to the online source of information assigned to software agent 110. For example, the initial hash value may be generated as a hash value of data associated with an identifier of software agent 110 (e.g., a software agent identifier assigned to software agent 110), data associated with a role of a software agent (e.g., a software agent role identifier assigned to software agent 110), and/or the private encryption key assigned to software agent 110. Additionally or alternatively, the initial hash value may be generated as a hash value of an internet protocol address of software agent 110, a media access control (MAC) address of software agent 110, and/or other identification parameter (e.g., device fingerprint, machine fingerprint, browser fingerprint, and/or the like) of software agent 110.

In some non-limiting embodiments or aspects, RPA management system 102 may store the initial hash value received from software agent 110. For example, RPA management system 102 may store the initial hash value in a data structure of RPA database device 104, where the initial hash value is stored with (e.g., assigned to) data associated with software agent 110 (e.g., a software agent identifier of software agent 110, a software agent role identifier of software agent 110, and/or a private encryption key of software agent 110).

As shown in FIG. 3, at step 306, process 300 may include determining whether to allow access by the software agent. For example, RPA management system 102 may determine whether to allow access to the online source of information by software agent 110 (e.g., determine whether to authenticate software agent 110 for access to the online source of information). In some non-limiting embodiments or aspects, RPA management system 102 may determine whether to allow access to the online source of information based on a request to access the online source of information (e.g., as part of a request to access the online source of information for a data transaction to retrieve information from the online source of information). For example, RPA management system 102 may determine whether to allow access to the online source of information based on data included in the request to access the online source of information transmitted by software agent 110. In some non-limiting embodiments or aspects, the request to access the online source of information may include a hash value (e.g., a hash value received after the initial hash value, a second hash value, and/or the like) and/or data associated with software agent 110, such as data associated with a role of software agent 110. In some non-limiting embodiments or aspects, RPA management system 102 may receive the hash value and/or data associated with software agent 110 and RPA management system 102 may determine whether to allow access to the online source of information based on the hash value and/or the data associated with software agent 110.

In some non-limiting embodiments or aspects, the hash value included in the request to access the online source of information may be generated, using the private encryption key associated with software agent 110, as a hash value based on (e.g., a hash value of) software agent credential data associated with access credentials to the online source of information assigned to software agent 110. For example, the hash value may be generated as a hash value of data associated with an identifier of software agent 110 (e.g., a software agent identifier assigned to software agent 110), data associated with a role of a software agent (e.g., a software agent role identifier assigned to software agent 110), and/or the private encryption key assigned to software agent 110. Additionally or alternatively, the hash value may be generated as a hash value of an internet protocol address of software agent 110, a MAC address of software agent 110, and/or other identification parameter (e.g., device fingerprint, machine fingerprint, browser fingerprint, and/or the like) of software agent 110. In some non-limiting embodiments or aspects, RPA management system 102 may receive the request to access the online source of information transmitted by software agent 110 and RPA management system 102 may obtain the hash value from the request. In some non-limiting embodiments or aspects, RPA management system 102 may retrieve the initial hash value from a data structure of RPA database device 104. For example, RPA management system 102 may retrieve the initial hash value from the data structure based on receiving the hash value from software agent 110.

In some non-limiting embodiments or aspects, RPA management system 102 may determine whether to allow access to the online source of information based on the hash value transmitted by software agent 110. For example, software agent 110 may transmit the hash value to RPA management system 102 as part of the request to access the online source of information. RPA management system 102 may receive the hash value from software agent 110 and RPA management system 102 may compare the hash value received as part of the request to access the online source of information to a hash value (e.g., the initial hash value) assigned to software agent 110 (e.g., a hash value stored in RPA database device 104 that is assigned to software agent 110). If RPA management system 102 determines that the hash value received as part of the request to access the online source of information corresponds to the hash value assigned to software agent 110, then RPA management system 102 may determine to allow access to the online source of information by software agent 110. If RPA management system 102 determines that the hash value received as part of the request to access the online source of information does not correspond to the hash value assigned to software agent 110, then RPA management system 102 may determine not to allow access to the online source of information by software agent 110.

In some non-limiting embodiments or aspects, RPA management system 102 may determine whether to allow access to the online source of information based on the hash value and data associated with software agent 110 received as part of the request to access the online source of information. For example, software agent 110 may transmit the hash value to RPA management system 102 and data associated with the role of software agent 110, such as a software agent role identifier of software agent 110, as part of the request to access the online source of information. RPA management system 102 may receive the hash value and the data associated with the role of software agent 110 received as part of the request to access the online source of information and RPA management system 102 may compare the hash value and the data associated with the role of software agent 110 to a hash value (e.g., the initial hash value) and data associated with the role of software agent 110 assigned to software agent 110. If RPA management system 102 determines that the hash value and the data associated with the role of software agent 110 received as part of the request to access the online source of information corresponds to the hash value and data associated with the role of software agent 110 assigned to software agent 110, then RPA management system 102 may determine to allow access to the online source of information by software agent 110. If RPA management system 102 determines that the hash value and the data associated with the role of software agent 110 received as part of the request to access the online source of information does not correspond to the hash value and data associated with the role of software agent 110 assigned to software agent 110, then RPA management system 102 may determine not to allow access to the online source of information by software agent 110.

In some non-limiting embodiments or aspects, RPA management system 102 may determine whether to allow access to the online source of information to a first software agent 110 based on the hash value received as part of the request by the first software agent 110 to access the online source of information and a hash value received from a second software agent 110. For example, the first software agent 110 may transmit the hash value to RPA management system 102 as part of the request by the first software agent 110 to access the online source of information. RPA management system 102 may receive the hash value from software agent 110 and RPA management system 102 may compare the hash value received as part of the request to access the online source of information to a hash value (e.g., the initial hash value) assigned to software agent 110 (e.g., a hash value stored in RPA database device 104 that is assigned to software agent 110). If RPA management system 102 determines that the hash value received as part of the request by the first software agent 110 corresponds to the hash value assigned to the first software agent 110, then RPA management system 102 may request a hash value from the second software agent 110. If RPA management system 102 determines that the hash value received from the second software agent 110 corresponds to the hash value assigned to the second software agent 110, then RPA management system 102 may determine to allow access to the online source of information by the first software agent 110.

In some non-limiting embodiments or aspects, RPA management system 102 may determine whether to allow access to sensitive data included in (e.g., a source of sensitive data included in) the online source of information by software agent 110. For example, software agent 110 may transmit the request to access the sensitive data included in the online source of information to RPA management system 102. RPA management system 102 may receive the request and RPA management system 102 may determine that the request is a request to access the sensitive data included in the online source of information. RPA management system 102 may transmit one or more challenge questions to software agent 110 and software agent 110 may receive the one or more challenge questions. Software agent 110 may generate a hash value (e.g., using the private encryption key associated with software agent 110, as a hash value based on software agent credential data associated with access credentials to the online source of information assigned to software agent 110) and a response to the one or more challenge questions and software agent 110 may transmit the hash value and the response to the one or more challenge questions to RPA management system 102. In some non-limiting embodiments or aspects, the one or more challenge questions may include a previously agreed upon knowledge-based challenge question, a challenge question that includes a one-time nonce expression, and/or a general challenge question that is solvable by software agent 110.

In the example above, RPA management system 102 may determine whether to allow access to the sensitive data included in the online source of information by software agent 110 based on the hash value and the response to the one or more challenge questions received from software agent 110. In some non-limiting embodiments or aspects, if RPA management system 102 determines that the hash value and the response to the one or more challenge questions received from software agent 110 corresponds to the hash value assigned to software agent 110 and an expected response to the one or more challenge questions, then RPA management system 102 may determine to allow access to sensitive data included in the online source of information by software agent 110. If RPA management system 102 determines that the hash value and/or the response to the one or more challenge questions received from software agent 110 does not correspond to the hash value assigned to software agent 110 and/or an expected response to the one or more challenge questions, then RPA management system 102 may determine not to allow access to the sensitive data included in the online source of information by software agent 110.

In some non-limiting embodiments or aspects, RPA management system 102 may transmit the one or more challenge questions to software agent 110 based on the hash value received as part of the request to access sensitive data included in the online source of information by the first software agent 110. For example, RPA management system 102 may receive the hash value and RPA management system 102 may determine whether the hash value corresponds to the hash value assigned to software agent 110. If RPA management system 102 determines that the hash value corresponds to the hash value assigned to software agent 110, then RPA management system 102 may transmit the one or more challenge questions to software agent 110. If RPA management system 102 determines that the hash value does not correspond to the hash value assigned to software agent 110, then RPA management system 102 may not transmit the one or more challenge questions to software agent 110.

In some non-limiting embodiments or aspects, RPA management system 102 may determine whether to allow access to the sensitive data included in the online source of information by software agent 110 based on the response to the one or more challenge questions received from software agent 110. For example, RPA management system 102 may receive the response to the one or more challenge questions received from software agent 110 and RPA management system 102 may determine whether the response to the one or more challenge questions received from software agent 110 corresponds to the expected response to the one or more challenge questions. If RPA management system 102 determines that the response to the one or more challenge questions received from software agent 110 corresponds to the expected response to the one or more challenge questions, then RPA management system 102 may determine to allow access to the sensitive data included in the online source of information by software agent 110. If RPA management system 102 determines that the response to the one or more challenge questions received from software agent 110 does not correspond to the expected response to the one or more challenge questions, then RPA management system 102 may determine not to allow access to the sensitive data included in the online source of information by software agent 110.

As shown in FIG. 3, at step 308 ("NO" at step 306), process 300 may include denying access by the software agent. For example, RPA management system 102 may deny access to the online source of information by software agent 110 based on determining not to allow access by software agent 110. In some non-limiting embodiments or aspects, RPA management system 102 may transmit a message to client device 108 based on RPA management system 102 denying access to the online source of information by software agent 110. In some non-limiting embodiments or aspects, the message may include an indication of a reason associated with RPA management system 102 determining not to allow access to the online source of information by software agent 110.

As shown in FIG. 3, at step 310 ("YES" at step 306), process 300 may include processing a request involving the software agent. For example, RPA management system 102 may process a request to access the online source of information involving software agent 110. In some non-limiting embodiments or aspects, RPA management system 102 may receive a request to access the online source of information from software agent 110 and determine to allow access to the online source of information by software agent 110 based on data included in the request. RPA management system 102 may process the request to access the online source of information from software agent 110 based on determining to allow access to the online source of information by software agent 110.

In some non-limiting embodiments or aspects, RPA management system 102 may process the request to access the online source of information by allowing software agent 110 to carry out an operation. For example, RPA management system 102 may process the request to access the online source of information by allowing software agent 110 to carry out an operation (e.g., access the online source of information and conduct a data transaction involving the online source of information) based on a software agent role identifier of software agent 110. In some non-limiting embodiments or aspects, RPA management system 102 may process the request to access the online source of information based on data associated with a role of software agent 110. For example, RPA management system 102 may process the request to access the online source of information based on data associated with a role of software agent 110 included in the request to access the online source of information. In some non-limiting embodiments or aspects, RPA management system 102 may allow software agent 110 to carry out the operation on (e.g., only on) a specific type of data included in the online source of information based on the data associated with a role of software agent 110.

In some non-limiting embodiments or aspects, RPA management system 102 may determine a specific type of data included in the online source of information on which software agent 110 is allowed to carry out an operation based on the data associated with the role of software agent 110. For example, RPA management system 102 may obtain data associated with a role of software agent 110 from the request to access the online source of information and RPA management system 102 may determine the specific type of data included in the online source of information on which software agent 110 is allowed to carry out an operation based on the data obtained by RPA management system 102.

In some non-limiting embodiments or aspects, RPA management system 102 may determine whether to allow access to a specific type of data included in the online source of information by software agent 110 (e.g., determine whether to authorize software agent 110 for access to a specific type of data included in the online source of information). For example, RPA management system 102 may obtain data associated with a role of software agent 110 from the request to access the online source of information. RPA management system 102 may determine whether the data associated with the role of software agent 110 corresponds to data associated with the role of software agent 110 assigned to software agent 110 (e.g., data associated with the role of software agent 110 stored in a data structure and assigned to software agent 110). If RPA management system 102 determines that the data associated with the role of software agent 110 corresponds to the data associated with the role of software agent 110 assigned to software agent 110, then RPA management system 102 may determine to allow access to the specific type of data included in the online source of information by software agent 110. If RPA management system 102 determines that the data associated with the role of software agent 110 does not correspond to the data associated with the role of software agent 110 assigned to software agent 110, then RPA management system 102 may determine not to allow access to the specific type of data included in the online source of information by software agent 110.

In some non-limiting embodiments or aspects, RPA management system 102 may allow software agent 110 to access the online source of information and conduct a data transaction involving the online source of information. For example, RPA management system 102 may allow software agent 110 to access the online source of information and conduct the data transaction that involves obtaining, copying, deleting, adding to, performing calculations on, and/or the like, data included in the online source of information (e.g., data associated with a user of client device 108 included in the online source of information). In some non-limiting embodiments or aspects, RPA management system 102 may generate a data record (e.g., a software agent data record) associated with the data transaction involving the software agent. For example, RPA management system 102 may generate the data record for the data transaction involving the software agent based on software agent 110 conducting the data transaction involving the online source of information. In some non-limiting embodiments or aspects, the data record may include data associated with the data transaction. For example, the data record may include data associated with a time and/or a date of the data transaction conducted by software agent 110, data associated with a role of software agent 110, data associated with an identifier of software agent 110, a private encryption key associated with (e.g., assigned to) software agent 110, and/or data associated with a hash value received from software agent 110 (e.g., a data associated with a hash value received from software agent 110 as part of a request to access the online source of information).

As shown in FIG. 3, at step 312, process 300 may include storing a data record associated with the software agent. For example, RPA management system 102 may store the data record associated with a data transaction conducted by software agent 110 involving the online source of information. In some non-limiting embodiments or aspects, RPA management system 102 may store data records for data transactions conducted by software agents 110 involving the online source of information in a data structure. For example, RPA management system 102 may store data records for data transactions conducted by software agents 110 involving the online source of information in a distributed ledger (e.g., distributed ledger 400), such as a blockchain. In this way, RPA management system 102 may more securely and with less immutability, store data records for data transactions conducted by software agents 110 as compared to storing the data records in a data structure that does not involve a distributed ledger. In some non-limiting embodiments or aspects, RPA management system 102 may allow access to the distributed ledger by software agents 110 and/or client device 108.

Figure 4B:
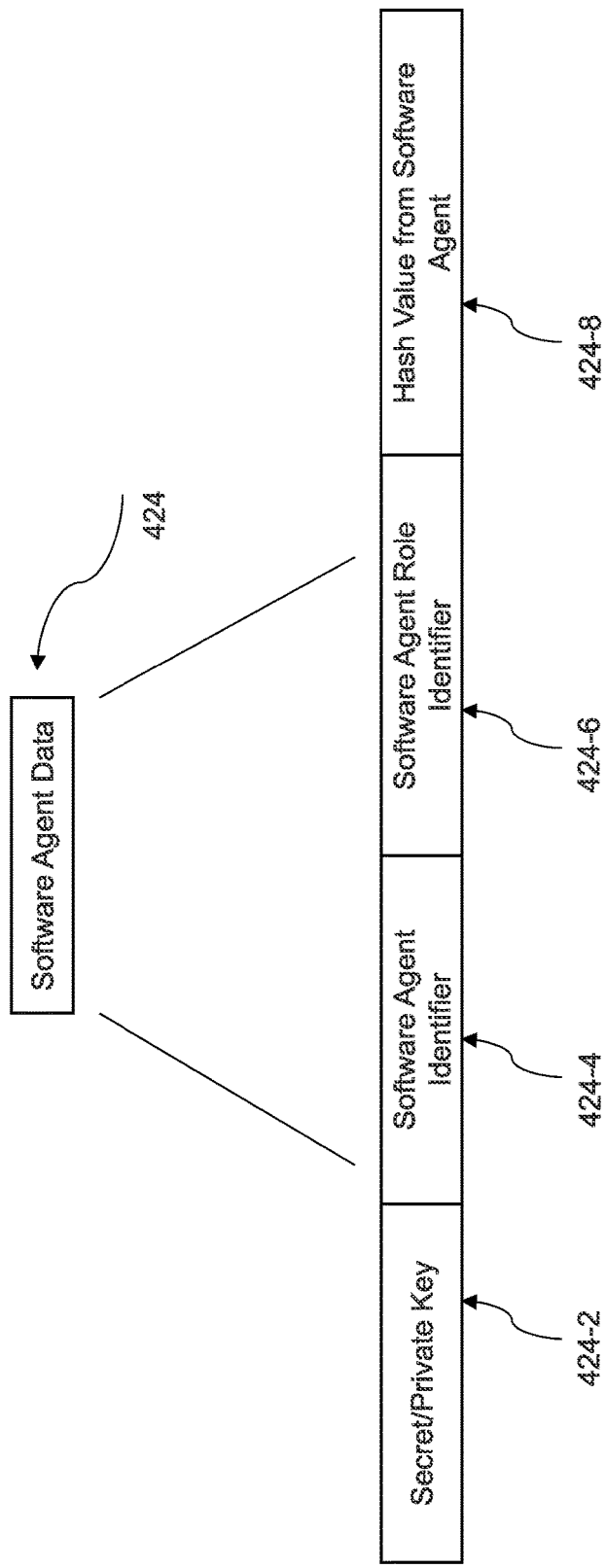

Referring now to FIGS. 4A and 4B, FIGS. 4A and 4B are diagrams of a non-limiting embodiment or aspect of distributed ledger 400 used by RPA management system 102 to store data records for data transactions conducted by software agents 110 involving the online source of information. As shown in FIG. 4A, distributed ledger 400 may include a plurality of blocks 402, 404, 406 that make up a blockchain. Each block 402, 404, 406 may include hash records 422, 442, 462, which may include a hash value of information included in a previous block in the blockchain. Additionally or alternatively, each block 402, 404, 406 may include software agent data records 424, 444, 464, which represents data associated with a transaction conducted by a software agent (e.g., software agent 110). As shown in FIG. 4B, software agent data record 424 may include a plurality of sub-records 424-2, 424-4, 424-6, 424-8. In some non-limiting embodiments or aspects, sub-record 424-2 may include data associated with a secret and/or data associated with a private encryption key of a software agent that conducted a transaction associated with software agent data record 424. In some non-limiting embodiments or aspects, sub-record 424-4 may include data associated with an identifier of a software agent (e.g., a software agent identifier of a software agent) that conducted a transaction associated with software agent data record 424. Additionally or alternatively, sub-record 424-4 may include data associated with a software agent role identifier of a software agent that conducted a transaction associated with software agent data record 424, data associated with a software agent identifier of a software agent that conducted a transaction associated with software agent data record 424, and/or data associated with a hash value received from a software agent that conducted a transaction associated with software agent data record 424. In some non-limiting embodiments or aspects, software agent data records 444, 464 may be the same or similar to software agent data record 424. For example, software agent data records 444, 464 may include the same or similar sub-records as software agent data record 424.

Referring now to FIGS. 5A-5G, FIGS. 5A-5G are diagrams of a non-limiting embodiment or aspect of an implementation 500 relating to a process for validating a software agent in an RPA system. As shown by reference number 505 in FIG. 5A, RPA management system 102 may receive a verification request from client device 108. In some non-limiting embodiments or aspects, the verification request may include data associated with a requested operation (e.g., allowing access to the online service) and/or an identifier of the user associated with client device 108. As shown by reference number 510 in FIG. 5B, RPA management system 102 may transmit a digital certificate to client device 108. In some non-limiting embodiments or aspects, RPA management system 102 may transmit the digital certificate issued to client device 108 based on (e.g., in response to) the verification request from client device 108. In some non-limiting embodiments or aspects, RPA management system 102 may transmit a verification response based on (e.g., in response to) the verification request from client device 108 and the verification response may include the digital certificate issued to client device 108.

Figure 5A:
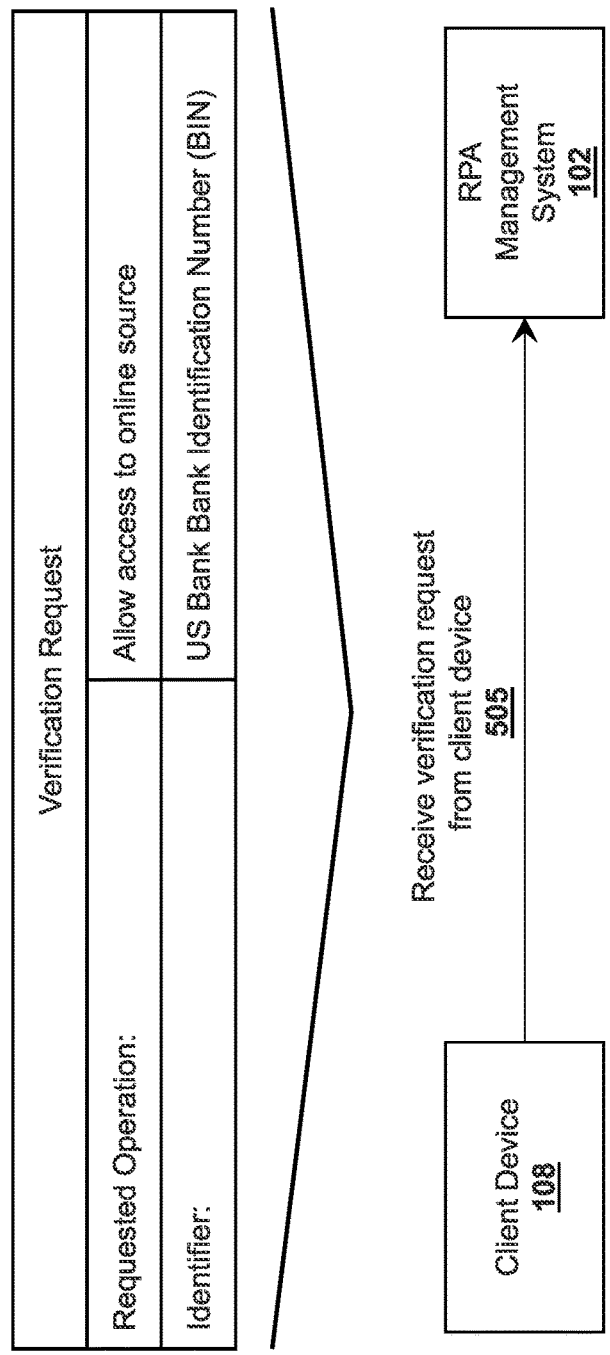
Figure 5C:
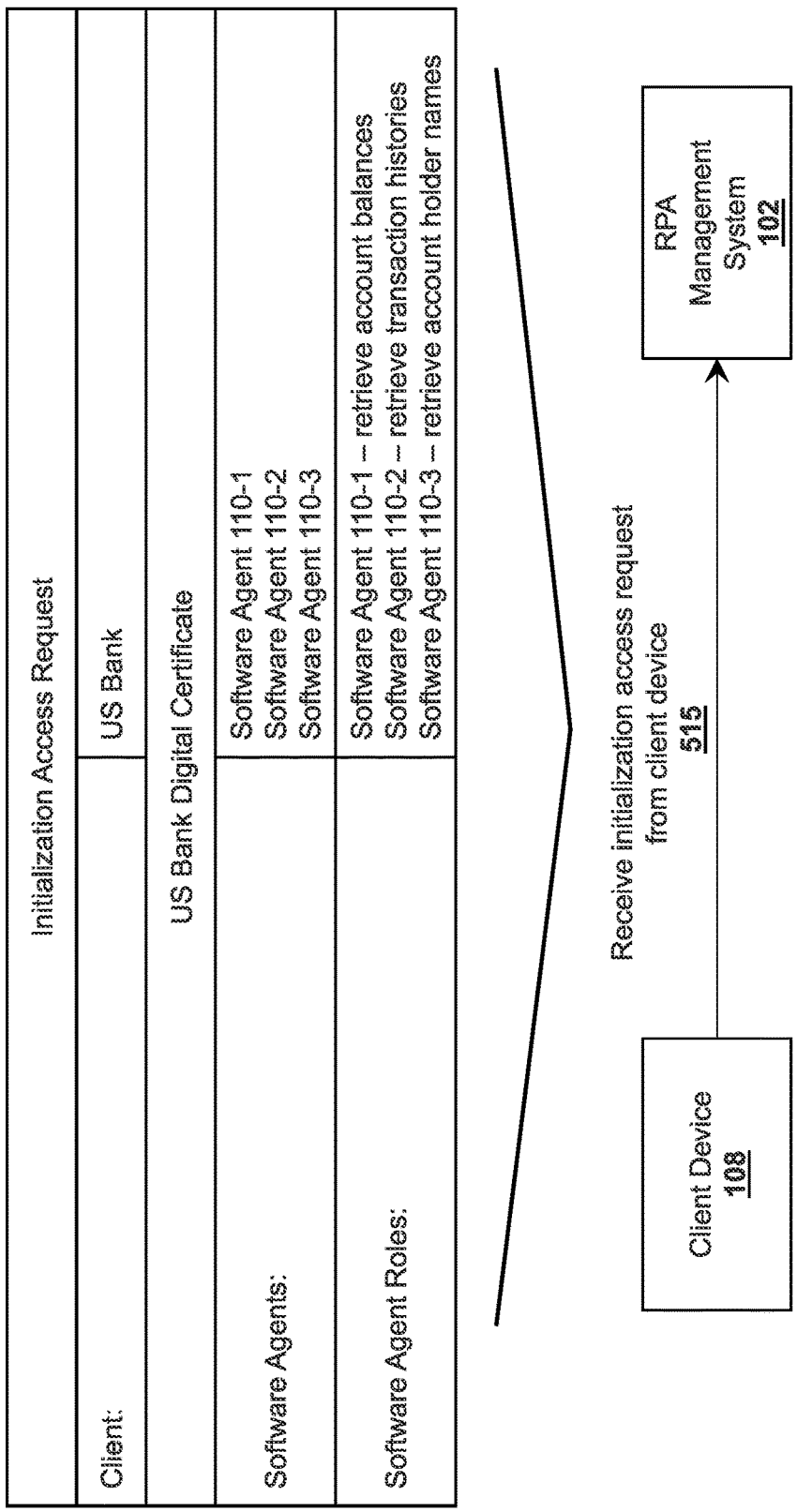

As shown by reference number 515 in FIG. 5C, RPA management system 102 may receive an initialization access request from client device 108. In some non-limiting embodiments or aspects, the initialization access request is a request for authorization to access to the online source of information by software agents 110 of client device 108. In some non-limiting embodiments or aspects, the initialization access request may include data associated with the digital certificate issued to client device 108, data associated with an identifier of client device 108 (e.g., an identifier of a user of client device 108), data associated with one or more identifiers of software agents 110, and data associated with roles of (e.g., operations to be carried out by) software agents 110. As shown by reference number 520 in FIG. 5D, RPA management system 102 may generate software agent credential data associated with access credentials to the online source of information and RPA management system 102 may store the software agent credential data associated with access credentials to the online source of information.

As further shown by reference number 525 in FIG. 5D, RPA management system 102 may transmit a plurality of private encryption keys to client device 108 (e.g., software agents 110 of client device 108). In some non-limiting embodiments or aspects, the plurality of private encryption keys may be included in the software agent credential data associated with access credentials to the online source of information generated by RPA management system 102. In some non-limiting embodiments or aspects, RPA management system 102 may transmit the plurality of private encryption keys on receiving the initialization access request from client device 108.

Figure 5E:
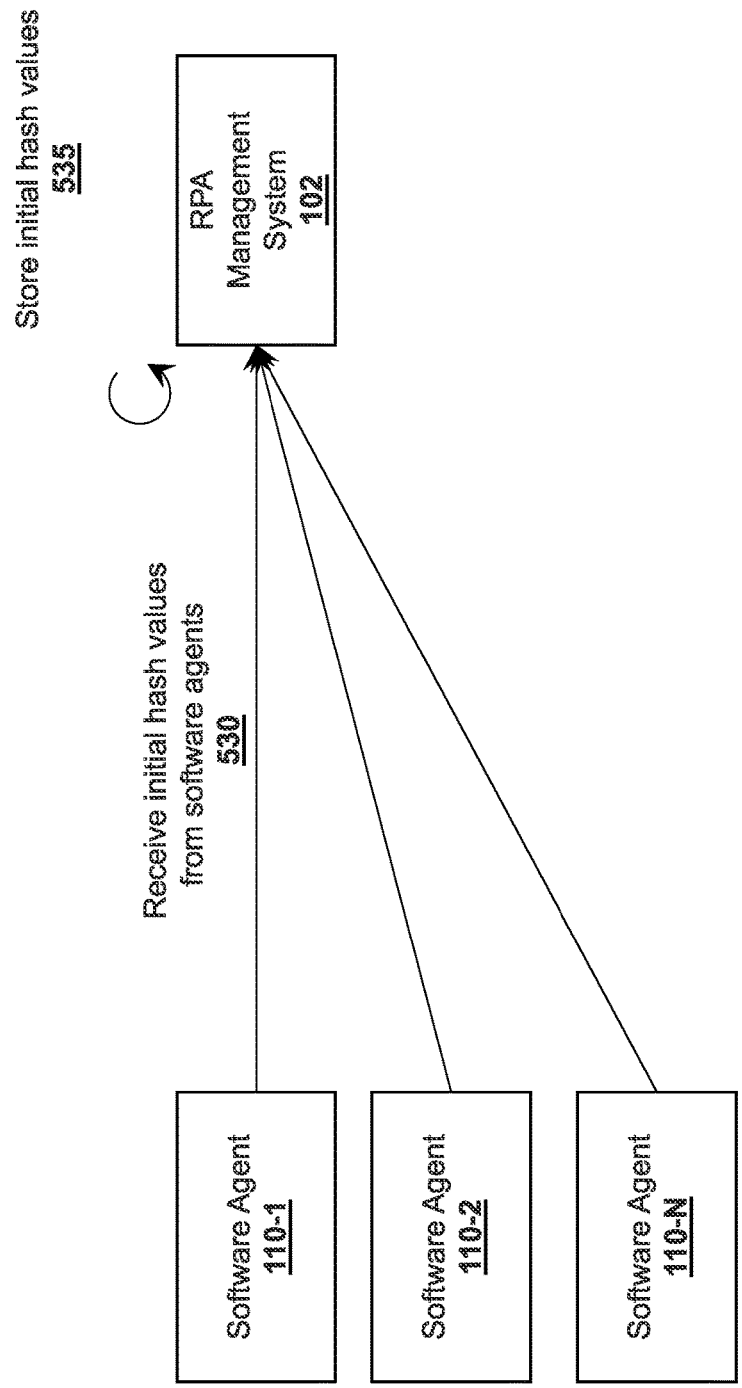

As shown by reference number 530 in FIG. 5E, RPA management system 102 may receive initial hash values from software agents 110. In some non-limiting embodiments or aspects, RPA management system 102 may receive the initial hash value from software agent 110 before software agent 110 transmits a request to access the online source of information (e.g., a request to access the online source of information for a data transaction to retrieve information from the online source of information). In some non-limiting embodiments or aspects, the initial hash value may be generated (e.g., generated by software agent 110, generated by RPA management system 102) using the private encryption key associated with each software agent 110. As further shown by reference number 535 in FIG. 5E, RPA management system 102 may store the initial hash values received from software agents 110.

Figure 5F:
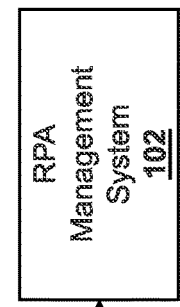
Figure 5F:
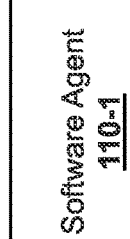

As shown by reference number 540 in FIG. 5F, RPA management system 102 may receive a hash value (e.g., a second hash value) from software agents 110-1 as part of a request to access the online source of information. In some non-limiting embodiments or aspects, the request to access the online source of information may include the hash value and data associated with software agent 110-1 of client device 108 (e.g., software agent 110-1 that transmitted the request to access the online source of information). As further shown by reference number 545 in FIG. 5F, RPA management system 102 may determine to allow access to the online source of information by software agent 110-1 based on the hash value received from software agents 110-1.

Figure 5G:
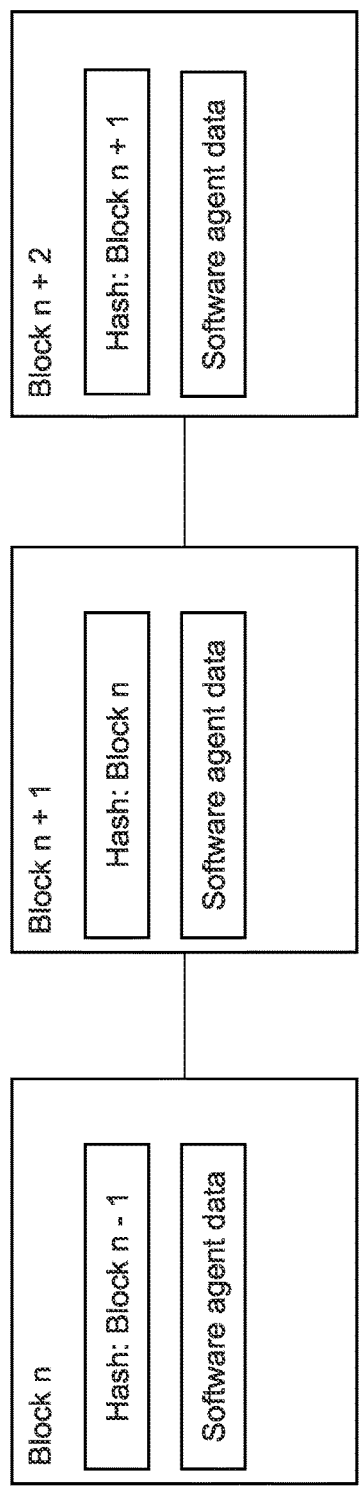

As shown by reference number 550 in FIG. 5G, RPA management system 102 may store a data record associated with a data transaction conducted by software agent 110-1. In some non-limiting embodiments or aspects, RPA management system 102 may store the data record associated with the data transaction conducted by software agent 110-1 involving the online source of information in a distributed ledger (e.g., distributed ledger 400), such as a blockchain, a copy of which may be stored in RPA database device 104.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:
at least one processor programmed or configured to:
receive a first hash value from an automated software agent of a client device, wherein the first hash value is generated by the client device using a private encryption key of a public/private encryption key pair for the automated software agent of the client device;
store the first hash value in a database; and
process a request to access an online source of information involving the automated software agent of the client device, wherein, when processing the request to access the online source of information, the at least one processor is programmed or configured to:
receive a second hash value from the automated software agent of the client device and data associated with a role of the automated software agent included in the request to access the online source of information, wherein the second hash value is generated by the client device using the private encryption key, and wherein the data associated with a role of the automated software agent comprises at least one of the following:
a unique identifier of an operation to be carried out by the automated software agent,
an indication of a specific type of data upon which the automated software agent is to carry out an operation, or
any combination thereof;
determine whether to allow access to the online source of information by the automated software agent based on the first hash value and the second hash value received from the automated software agent of the client device, wherein, when determining whether to allow access to the online source of information, the at least one processor is programmed or configured to:

determine whether the second hash value received from the automated software agent of the client device corresponds to the first hash value; and
determine a specific type of data included in the online source of information on which the automated software agent is to carry out an operation based on at least one of the following:
the unique identifier of an operation to be carried out by the automated software agent,
the indication of the specific type of data upon which the automated software agent is to carry out an operation, or
any combination thereof; and
allow the automated software agent to conduct a data transaction involving the specific type of data included in the online source of information based on determining to allow access to the online source of information by the automated software agent of the client device.

2. The system of claim 1, wherein, when determining whether to allow access to the online source of information by the automated software agent of the client device, the at least one processor is programmed or configured to:
retrieve the first hash value from the database based on an identifier of the automated software agent of the client device;
compare the second hash value received from the automated software agent to the first hash value retrieved from the database; and
determine to allow access to the online source of information by the automated software agent of the client device based on determining that the second hash value received from the automated software agent corresponds to the first hash value retrieved from the database.

3. The system of claim 1, wherein, when receiving the second hash value from the automated software agent of the client device, the at least one processor is programmed or configured to:
receive the request to access the online source of information from the automated software agent, wherein the request to access the online source of information includes the second hash value and the data associated with a role of the automated software agent of the client device.

4. The system of claim 1, wherein the at least one processor is further programmed or configured to:
generate the private encryption key of the public/private encryption key pair, wherein the private encryption key is assigned to the automated software agent of the client device; and
transmit the private encryption key of the public/private encryption key pair to the automated software agent of the client device.

5. The system of claim 1, wherein the at least one processor is further programmed or configured to:
store a data record associated with the data transaction involving the online source of information in a data structure.

6. The system of claim 5, wherein, when storing the data record associated with the data transaction involving the online source of information in the data structure, the at least one processor is programmed or configured to:
store the data record associated with the data transaction involving the online source of information in a distributed ledger.

7. The system of claim 1, wherein the at least one processor is further programmed or configured to:
transmit a challenge question to the automated software agent of the client device; and
receive a response to the challenge question from the automated software agent of the client device,
wherein, when determining whether to allow access to the online source of information by the automated software agent of the client device, the at least one processor is programmed or configured to:
determine whether to allow access to the data included in the online source of information by the automated software agent of the client device based on the first hash value, the second hash value, and the response to the challenge question from the automated software agent of the client device.

8. A computer-implemented method, comprising:
receiving, with at least one processor, a first hash value from an automated software agent of a client device, wherein the first hash value is generated by the client device using a private encryption key of a public/private encryption key pair for the automated software agent of the client device;
storing, with at least one processor, the first hash value in a database; and
processing, with at least one processor, a request to access an online source of information involving the automated software agent of the client device, wherein processing the request to access the online source of information comprises:
receiving a second hash value from the automated software agent of the client device and data associated with a role of the automated software agent included in the request to access the online source of information, wherein the second hash value is generated by the client device using the private encryption key, and wherein the data associated with a role of the automated software agent comprises at least one of the following:
a unique identifier of an operation to be carried out by the automated software agent,
an indication of a specific type of data upon which the automated software agent is to carry out an operation, or
any combination thereof;
determining whether to allow access to the online source of information by the automated software agent based on the first hash value and the second hash value received from the automated software agent of the client device, wherein determining whether to allow access to the online source of information comprises:
determining whether the second hash value received from the automated software agent of the client device corresponds to the first hash value; and
determining a specific type of data included in the online source of information on which the automated software agent is to carry out an operation based on at least one of the following:
the unique identifier of an operation to be carried out by the automated software agent,
the indication of the specific type of data upon which the automated software agent is to carry out an operation, or
any combination thereof; and
allowing the automated software agent to conduct a data transaction involving the specific type of data included in the online source of information based on determining to allow access to the online source of information by the automated software agent of the client device.

9. The computer-implemented method of claim 8, wherein determining whether to allow access to the online source of information by the automated software agent of the client device comprises:
   retrieving the first hash value from the database based on an identifier of the automated software agent of the client device;
   comparing the second hash value received from the automated software agent to the first hash value retrieved from the database; and
   determining to allow access to the online source of information by the automated software agent of the client device based on determining that the second hash value received from the automated software agent corresponds to the first hash value retrieved from the database.

10. The computer-implemented method of claim 8, wherein receiving the second hash value from the automated software agent of the client device comprises:
    receiving the request to access the online source of information from the automated software agent, wherein the request to access the online source of information includes the second hash value and the data associated with a role of the automated software agent of the client device.

11. The computer-implemented method of claim 8, further comprising:
    generating the private encryption key of the public/private encryption key pair, wherein the private encryption key is assigned to the automated software agent of the client device; and
    transmitting the private encryption key of the public/private encryption key pair to the automated software agent of the client device.

12. The computer-implemented method of claim 8, further comprising:
    storing a data record associated with the data transaction involving the online source of information in the database.

13. The computer-implemented method of claim 12, wherein storing the data record associated with the data transaction involving the online source of information in the database comprises:
    storing the data record associated with the data transaction involving the online source of information in a distributed ledger.

14. The computer-implemented method of claim 8, further comprising:
    transmitting a challenge question to the automated software agent of the client device; and
    receiving a response to the challenge question from the automated software agent of the client device,
    wherein determining whether to allow access to the online source of information by the automated software agent of the client device comprises:
        determining whether to allow access to the data included in the online source of information by the automated software agent of the client device based on the first hash value, the second hash value, and the response to the challenge question from the automated software agent of the client device.

15. A computer program product, the computer program product comprising at least one non-transitory computer-readable medium including one or more instructions that, when executed by at least one processor, cause the at least one processor to:
    receive a first hash value from an automated software agent of a client device, wherein the first hash value is generated by the client device using a private encryption key of a public/private encryption key pair for the automated software agent of the client device;
    store the first hash value in a database; and
    process a request to access an online source of information involving the automated software agent of the client device, wherein, the one or more instructions that cause the at least one processor to process the request to access the online source of information, cause the at least one processor to:
        receive a second hash value from the automated software agent of the client device and data associated with a role of the automated software agent included in the request to access the online source of information, wherein the second hash value is generated by the client device using the private encryption key, and wherein the data associated with a role of the automated software agent comprises at least one of the following:
            a unique identifier of an operation to be carried out by the automated software agent,
            an indication of a specific type of data upon which the automated software agent is to carry out an operation, or
            any combination thereof;
        determine whether to allow access to the online source of information by the automated software agent based on the first hash value and the second hash value received from the automated software agent of the client device, wherein, the one or more instructions that cause the at least one processor to determine whether to allow access to the online source of information, cause the at least one processor to:
            determine whether the second hash value received from the automated software agent of the client device corresponds to the first hash value; and
            determine a specific type of data included in the online source of information on which the automated software agent is to carry out an operation based on at least one of the following:
                the unique identifier of an operation to be carried out by the automated software agent,
                the indication of the specific type of data upon which the automated software agent is to carry out an operation, or
                any combination thereof; and
        allow the automated software agent to conduct a data transaction involving the specific type of data included in the online source of information based on determining to allow access to the online source of information by the automated software agent of the client device.

16. The computer program product of claim 15, wherein, the one or more instructions that cause the at least one processor to determine whether to allow access to the online source of information by the automated software agent of the client device, cause the at least one processor to:
    retrieve the first hash value from the database based on an identifier of the automated software agent of the client device;

compare the second hash value received from the automated software agent to the first hash value retrieved from the database; and determine to allow access to the online source of information by the automated software agent of the client device based on determining that the second hash value received from the automated software agent corresponds to the first hash value retrieved from the database.

17. The computer program product of claim 15, wherein the one or more instructions further cause the at least one processor to:

generate the private encryption key of the public/private encryption key pair, wherein the private encryption key is assigned to the automated software agent of the client device; and transmit the private encryption key of the public/private encryption key pair to the automated software agent of the client device.

18. The computer program product of claim 15, wherein the one or more instructions further cause the at least one processor to:

store a data record associated with the data transaction involving the online source of information in a data structure.

19. The computer program product of claim 18, wherein, the one or more instructions that cause the at least one processor to store the data record associated with the data transaction involving the online source of information in the data structure, cause the at least one processor to:

store the data record associated with the data transaction involving the online source of information in a distributed ledger.

20. The computer program product of claim 15, wherein the one or more instructions further cause the at least one processor to:

transmit a challenge question to the automated software agent of the client device; and receive a response to the challenge question from the automated software agent of the client device, wherein, the one or more instructions that cause the at least one processor to determine whether to allow access to the online source of information by the automated software agent of the client device, cause the at least one processor to:

determine whether to allow access to the data included in the online source of information by the automated software agent of the client device based on the first hash value, the second hash value, and the response to the challenge question from the automated software agent of the client device.

* * * * *